United States Patent [19]

Hansel et al.

[11] Patent Number: 4,694,194

[45] Date of Patent: Sep. 15, 1987

[54] POWER SUPPLY WITH BATTERY BACKUP

[75] Inventors: Allen Hansel, Sea Bright; Ermand Centofanti, Allenwood; Thiagarajan Natarajan, Englishtown, all of N.J.

[73] Assignee: Concurrent Computer Corporation, Holmdel, N.J.

[21] Appl. No.: 794,920

[22] Filed: Nov. 4, 1985

[51] Int. Cl.$^4$ .............................................. H02J 9/00
[52] U.S. Cl. ....................................... 307/66; 307/64; 307/65; 363/41
[58] Field of Search ................ 307/64, 65, 66; 363/41

[56] References Cited

U.S. PATENT DOCUMENTS

| | | | |
|---|---|---|---|
| 3,660,750 | 5/1972 | Businelli | 363/41 |
| 3,959,711 | 5/1976 | Greenhalgh | 363/41 |
| 4,354,223 | 10/1982 | Turnbull | 363/41 |
| 4,475,047 | 10/1984 | Ebert, Jr. | 307/66 |

*Primary Examiner*—William M. Shoop, Jr.
*Assistant Examiner*—Richard K. Blum
*Attorney, Agent, or Firm*—Edwin T. Grimes; Frances L. Masselle; Thomas P. Murphy

[57] ABSTRACT

A pulsed power supply having a filter output and a battery backup includes electronic apparatus to sense when the AC source is failing. When the pulsed supply output has the same pulses as that which would be produced by the battery, the supply switches to battery backup mode. As the AC source returns, the supply switches to AC supply mode when the AC is at a level where the pulses produced by the supply would be the same as are actually being produced by the battery backup.

7 Claims, 8 Drawing Figures

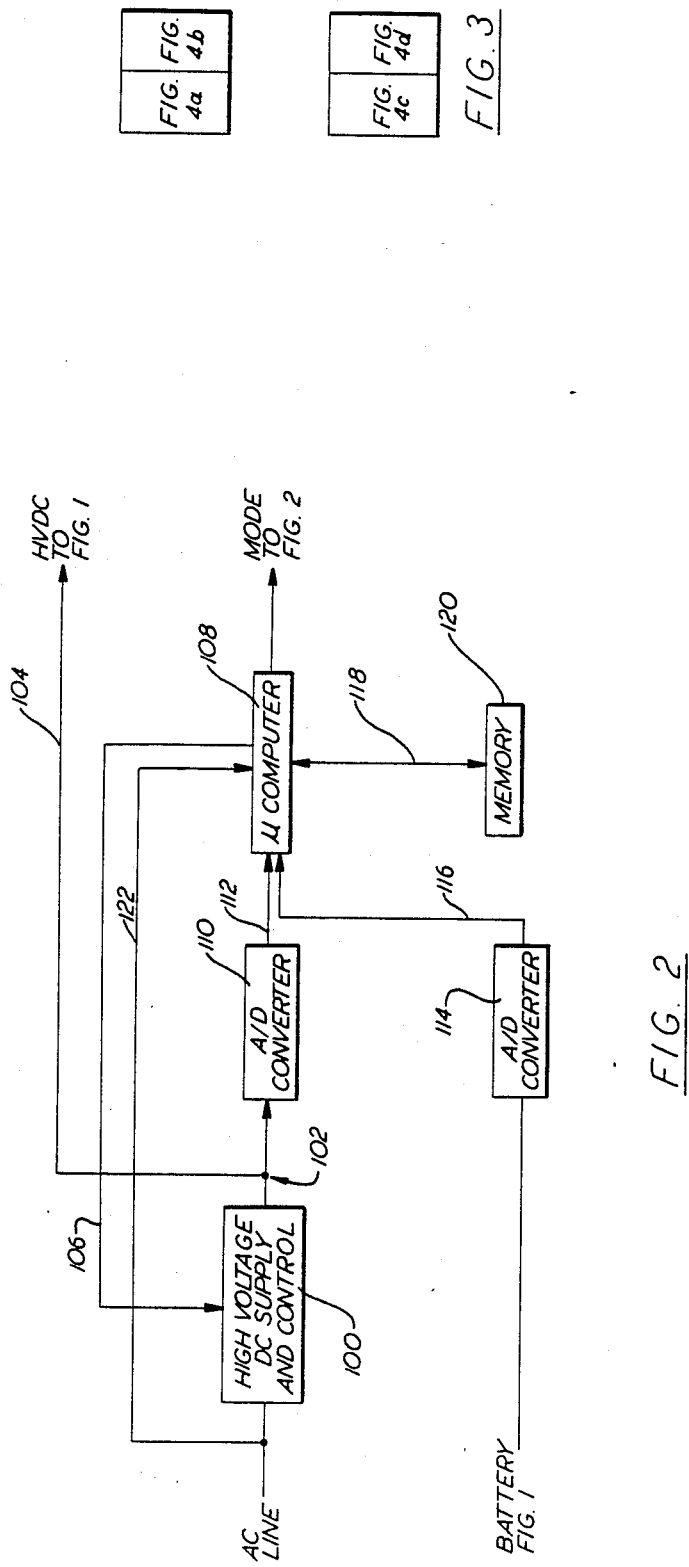

POWER SUPPLY WITH BATTERY BACKUP

FIELD OF THE INVENTION

The present invention relates broadly to the field of power supplies for digital computers and particularly to a power supply including a battery backup circuit which maintains power if the AC source fails. This type of power supply with battery backup is particularly useful for preventing a temporary power loss from destroying volatile data in a MOS memory of a digital computer system.

BACKGROUND OF THE INVENTION

In the field of electronics and especially digital computers, it is desirable that a system be unaffected by either a temporary power loss or, during peak power demand periods, power "brown out". Many approaches have been used in attempting to create such a system. One approach is to have a backup generator which automatically starts when the AC power is lost. This is a costly solution and usually results in at least a few seconds of power interruption which can be tolerated for some applications but for others it could be catastrophic such as in the field of digital computers where the complete data memory could be cleared if AC power were interrupted for several seconds.

In applications where a power interruption must be avoided, battery backup circuits have been developed which take over when the AC power fails. Such systems typically have a voltage sensor circuit to detect when the AC power has failed. Then, the existing power supply is electronically disconnected from the power distribution bus and the battery backup is then electronically coupled to the power distribution bus. This approach is quicker than the approach discussed above and is less expensive. However, as a complete power supply plus a full battery backup power supply is usually present, there is a significant cost to adding this type of battery backup to a typical system. In addition, when switching between the AC power line operated supply and the battery operated supply, some output voltage transitions do occur and these transitions may be a problem in certain applications such as for a solid state memory of a digital computer.

In view of the above stated difficulties, it is the principal object of the present invention to provide an uninterruptible power supply suitable for powering a solid state memory.

It is still a further objective of the present invention to provide an uninterruptible power supply that minimizes the voltage transition when the power supply is switched between AC power line operation and battery backup.

It is yet another objective of the present invention to provide an uninterruptible power supply which uses a significant portion of the circuitry for either AC power line operation or battery backup operating thereby favorably cutting the cost of the power supply and battery backup circuitry.

BRIEF DESCRIPTION OF THE INVENTION

The present power supply includes a typical double inversion AC power line operated power supply. The output voltage from the power supply is adjusted by a pulse width modulator circuit to be that which is desired. A battery backup circuit is switched into operation when a detector determines that the AC power line voltage has fallen to a preselected point. At the preselected point for the switching from the AC line to the battery backup the duty cycle of the pulse width modulator for producing the desired output voltage and current is the same for battery backup circuit as it is for the falling AC line voltage. Hence, when the switchover occurs, there is a minimum effect on the output voltage. Conversely, when the AC line voltage returns, when the AC line is sufficiently high to use the same duty cycle on the pulse width modulator to produce the same power output as is then being suplied by the battery backup circuit, the circuit switches from backup to AC line power producing a minimum of transition at the supply output.

BRIEF DESCRIPTION OF THE DRAWINGS

The foregoing objects, advantages and features of the present invention are described below in greater detail in connection with the drawings which form a part of the original disclosure wherein:

FIG. 2 is a functional block diagram of the circuitry for controlling the high voltage DC and producing the mode signal used by the circuitry of FIG. 1;

FIG. 3 illustrates the manner in which FIGS. 4a–4d fit together to form a detailed circuit diagram of the present invention;

DETAILED DESCRIPTION

Figure 1:
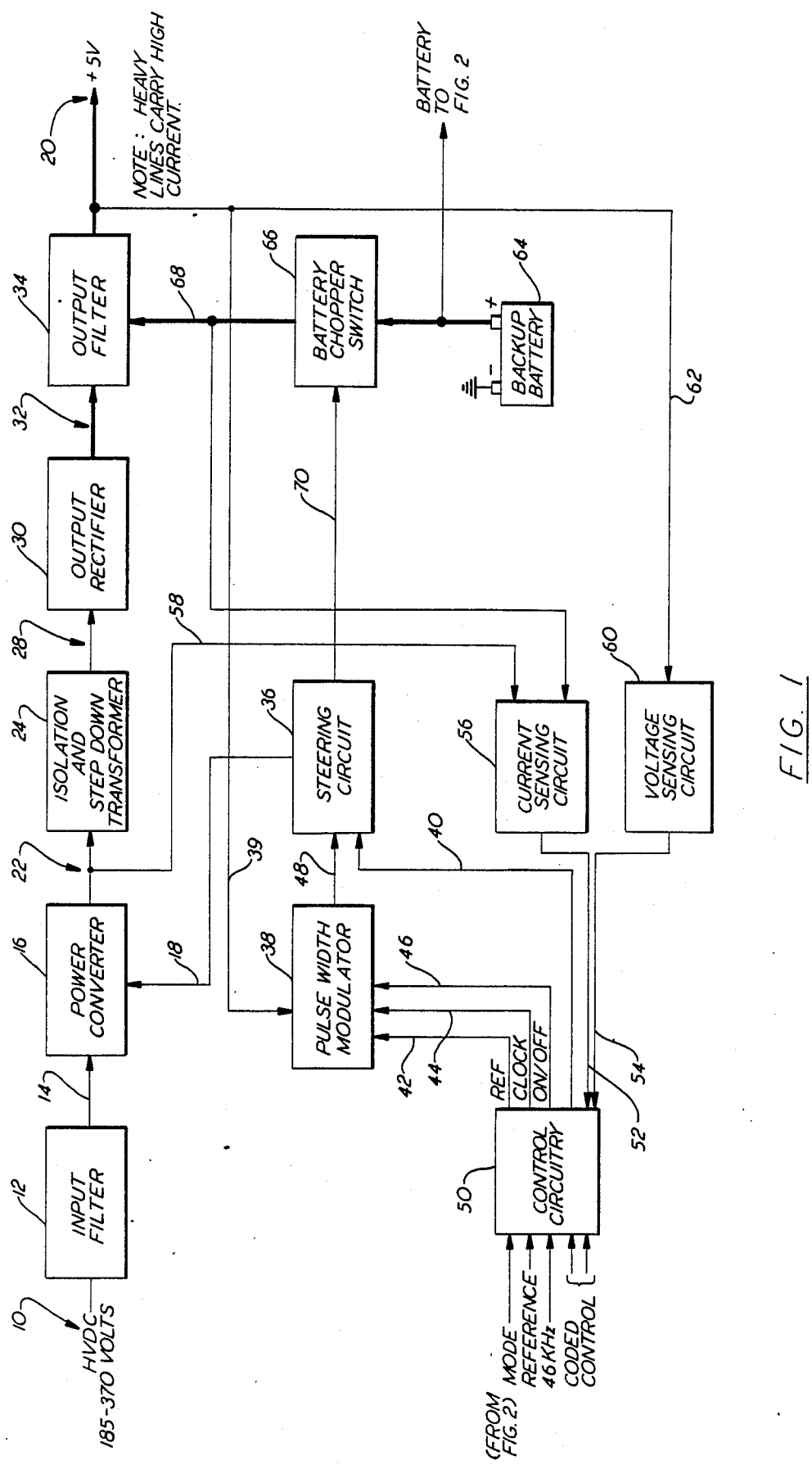
FIG. 1 is a functional block diagram of the present power supply.
Figure 4A:
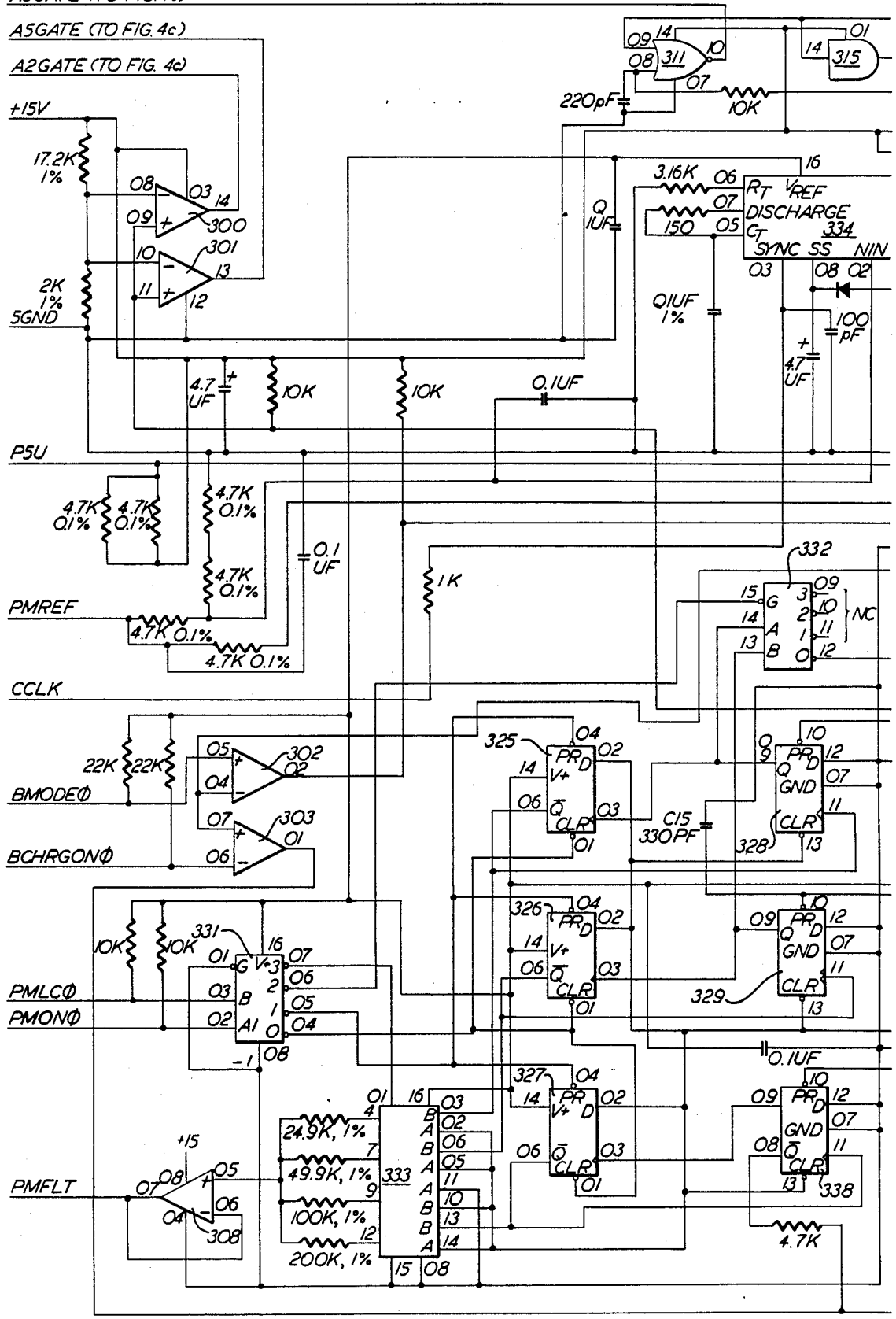
FIGS. 4a–4d comprise a detailed circuit diagram of the power suply of the present invention.
Figure 4B:
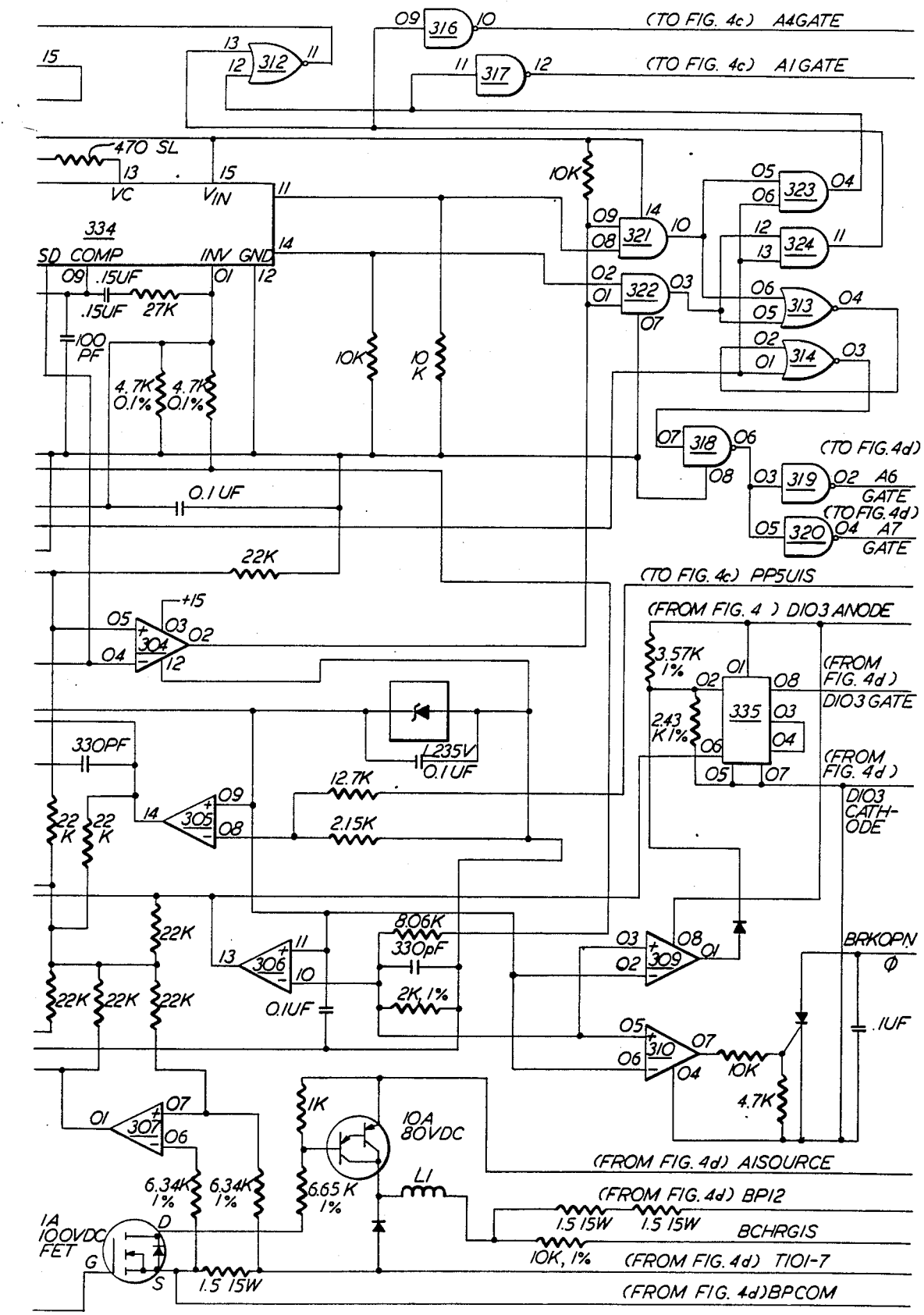
Figure 4C:
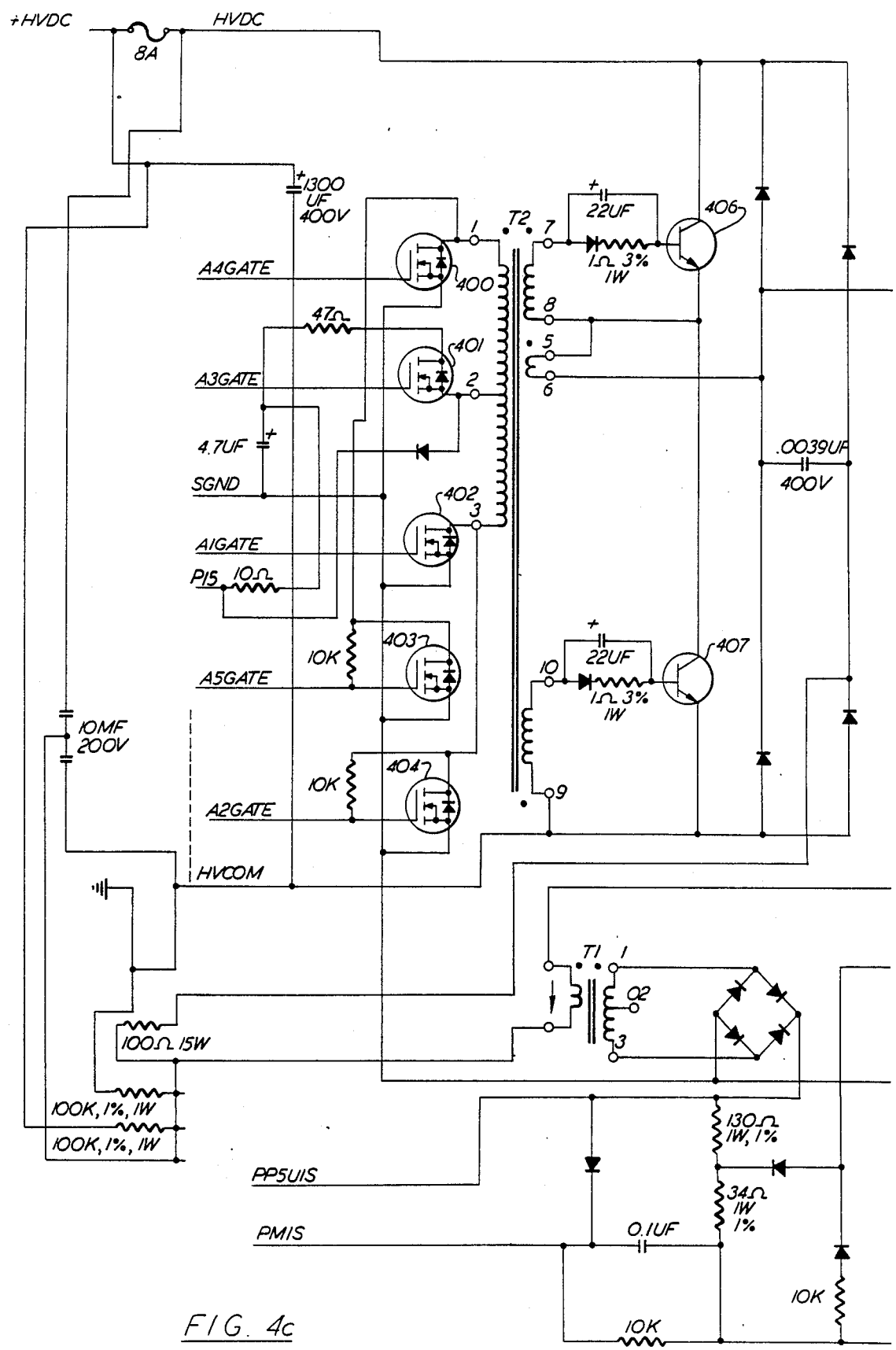
Figure 4D:
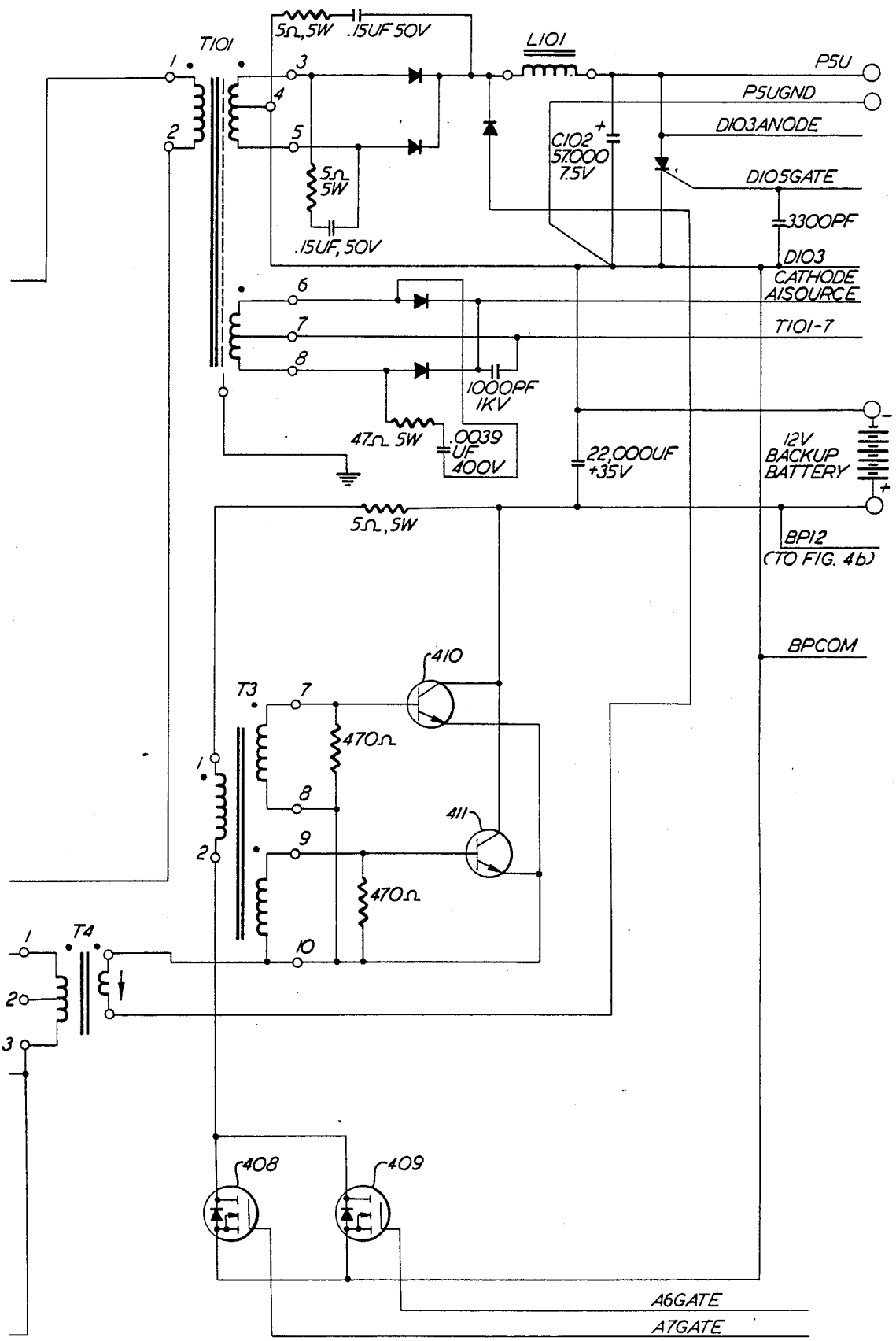

Referring to the functional block diagram of FIG. 1, the power supply of the present invention has a high voltage DC input, generally at 10, for receiving a DC voltage from between 185 and 370 volts. The high voltage DC input at 10 is not regulated so that an input filter 12 is coupled thereto so as to minimize the ripple present on the output thereof at 14. The input filter 12 may comprise, in the preferred embodiment, a large filter capacator or any other filter network designed to minimize AC ripple on the output voltage at 14.

The output voltage at 14 is coupled to a power converter 16. The power converter 16 receives pulses on the line 18 which are pulse width modulated. The power converter 16 utilizes the pulses on the line 18 to produce at 22, under typical operating conditions, a 300 volt AC 23 KHz square wave signal. This signal is applied to an isolation and step down transformer 24 which produces at it's output an AC signal of approximately 15 volts AC at the same frequency of that input to the transformer 24.

The AC signal at 28 is coupled to an output rectifier circuit 30 which produces at it's output 32 a pulsed signal having an amplitude typically between 8 and 17 volts and a duty cycle between 35 and 85 percent. This signal is then applied to an output filter 34 which typically comprises a conventional series inductance and shunt capacitance filter which produces a substantially constant DC voltage of 5 volts at its output 20 regardless of the current being supplied by the power supply or the input voltage at 10.

The power converter 16, as indicated above, receives pulsed signals on the line 18 from a steering circuit 36. The steering circuit 36 receives pulse width modulated signals from a pulse width modulator 38 and steering signals over the line 40 which indicate whether the power supply output should be derived from the input AC line (from which the High Voltage DC input at 10 is derived) or from a battery backup circuit. For the purposes of this discussion to date, the signal on the line 40 indicates that AC line voltage is present and, accordingly, the high voltage DC at the input line 10 should be used to derive the output voltage at 20.

The pulse width modulator 38 itself receives signals over the lines 42, 44 and 46 which are utilized by the pulse width modulator 38 to produce pulses on the line 48 which are wide enough so that, when they are steered by the steering circuit 36 to the power converter 16, the resulting output appearing at 20 from the output filter 34 is 5 volts.

The signals on the lines 42, 44 and 46 come from the control circuitry 50 which is operative to generate the required signals for the pulse width modulator 38. The control circuitry performs this function in response to a plurality of inputs including a voltage reference input, and 46 KHz square wave pulse input, 2 coded control lines, an over current indication on line 52 and an over voltage indication on line 54. The over current signal on line 52 is produced by a current sensing circuit 56 which couples via a line 58 to the output 22 of the power converter 16. The current sensing circuit 56 produces a signal on the line 52 when the current output from the power converter 16 which itself is a measure of the current being supplied by the power supply at point 20 is too high.

The over voltage signal on the line 54 is produced by a voltage sensing circuit 60 which couples to the output 20 of the power supply via the line 62. The voltage sensing circuit provides an over voltage signal on the line 54 when the voltage at 20 is too high.

The control circuitry 50 responds to the inputs mentioned above to place signals on the lines 42, 44 and 46 which cause the pulse width modulator 38 in cooperation with an internal voltage sensing circuit which responds to the reference voltage and the output voltage over line 39 to produce pulses on the line 48 which will result in producing a 5 volt output at point 20 at the current being supplied by the power supply at any particular moment. When the sensing circuit in the pulse width modulator 38 detects that the voltage at 20 is below its desired level, the pulse width modulator increases the width of the pulses produced thereby to cause the output voltage at 20 to rise. When the pulse width modulator 38 detects that the voltage at 20 is above its desired level, the pulse width modulator 38 reduces the width of pulses produced thereby to cause the output voltage at 20 to fall. The feedback network thus established is adjusted so that the response is fast but not so fast as to oscillate.

The control circuitry 50 also receives a mode signal from the circuitry of FIG. 2 which calculates the mode of operation for the power supply. The mode signal has two levels, one level designating that the high voltage DC input at 10, derived from the AC power line should be utilized to derive the output at point 20. The second level for the mode signal indicates that the backup battery 64 should be utilized to derive the output power at point 20. The manner in which the mode signal is generated will be discussed hereinafter in greater detail in connection with FIG. 2. For the time being, however, it should be recognized that the control circuitry 50 responds to the mode signal input thereto and places a signal on the output 40 which controls the operation of the steering circuit 36. In the situation where the mode signal indicates that the AC line should be used to derive power at the output 20, the signal on the line 40 causes the steering circuit 36 to divert the pulses on the line 48 from the pulse width modulator 38 to the line 18 and thus to the power converter 16. However, when the mode signal input to the control circuitry 50 indicates that the backup battery 64 should be used as the source of power at the output point 20, the control circuitry 50 changes the signal on the line 40 thereby causing the steering circuit 36 to divert the pulses from the pulse width modulator 38 to a battery chopper switch 66. The purpose of the battery chopper switch 66 is to produce a square wave output signal on the line 68 which is input to the output filter 34 so as to produce at the output 20 a 5 volt signal at the current being drawn from the power supply by the circuitry connected thereto. In accordance with the present invention, the mode signal switches from one mode to another at a time when the pulses produced by the pulse width modulator 38 will control either the power converter 16 or the battery chopper switch 66 in such a manner that the output voltage from the output filter 34 is the same and at the current level being supplied prior to the change of the mode signal. In this manner, transients at the output 20 are minimized due to the mode switching of the power supply.

The coded control lines input to the control circuitry 50 are 2 lines on which the voltage levels have significance and are interpreted by the control circuitry 50. As two voltage states can easily be recognized on each of the two input lines which comprise the coded control lines, four different control signals can be sent to the control circuitry 50 from circuits exterior thereto. In the preferred embodiment of the present invention, when both coded control lines have a high voltage thereon, the control circuitry 50 interprets that input to place a level on the line 46 which corresponds to the power supply being off. When this occurs, the pulse width modulator 38 responds thereto and does not produce any pulses at its output 48 thereby turning the power supply off.

The control circuitry 50 responds to other combinations of control levels on the coded control lines to produce three different courses of action for the control circuitry 50. In one combination of input levels on the coded control lines, the control circuitry 50 places an on level signal on the line 46 which causes the pulse width modulator 38 to produce pulses and thereby cause the power supply of the present invention to turn on. The other two unique combinations of levels for the coded control lines input to the control circuitry 50 do not have any direct bearing on the operation of the circuitry illustrated in FIG. 1. These control signals, however, are utilized in presetting and resetting a fault latch which is utilized in conjunction with a diagnostic system for the system powered by the present power supply. Furthermore, the fault latch is utilized in conjunction with other circuitry used in cooperation with the power supply of the present invention to shut it down in the event either an over voltage or over current condition is detected. This circuitry does not comprise a part of the present invention, and, therefor will not be described further herein.

Referring now to FIG. 2, the circuitry illustrated therein is for developing the input signals for the circuitry of FIG. 1. This circuitry includes a high voltage DC power supply and control 100 which couples to the input AC line. The high voltage DC power supply and control 100 produces at its output 102 the high voltage DC power which couples to the input filter 12 of FIG. 1 via the line 104.

The high voltage DC power supply and control comprises any suitable AC to DC power supply which produces voltage in the range of between 185 and 370 volts at the output 102. The high voltage DC supply and control 100 also includes a phase control bridge which is utilized therein to adjust the voltage at the output. This phase control bridge receives a phase signal on the line 106 which serves to make the voltage at the output 102 adjustable in a conventional manner. The phase signal is produced by the microcomputer 108 in a manner hereinafter described.

An analog to digital converter 110 is coupled to the output 102 of the high voltage DC supply and control 100 to produce a digital representation on the line 112 for the voltage appearing at 102. This digital information on line 112 is coupled to the microcomputer 108.

A second analog to digital converter 114 is provided in FIG. 2 which couples to the positive terminal of the battery in FIG. 1. The analog to digital converter 114 provides a digital representation on the line 116 representative of the voltage of the battery in FIG. 1. This digital representation on the line 116 is also coupled to the microcomputer 108.

The microcomputer 108 may comprise any conventional microcomputer which is coupled by a data bus 118 to a memory 120 which contains the operational program for the microcomputer 108.

The microcomputer 108 is coupled by the line 122 to the AC line so that the microcomputer can determine the zero crossings for the AC line voltage and can, under program control, produce phase signals on the line 106 in synchronism therewith so as to trigger the phase control bridge within the high voltage DC supply and control 100. By controlling the phase signals relative to the zero crossings of the AC line, the voltage at 102 can be precisely controlled.

In the normal operation of the power supply in accordance with the present invention, the AC line is active, at a normal voltage and is converted by the high voltage DC supply and control 100 to a high DC voltage at 102 which provides an input to point 10 in FIG. 1. The remainder of the circuitry of FIG. 1 is operative to convert the high DC voltage to an output voltage of 5 volts at point 20. The microcomputer 108 continually monitors the AC line input on line 122. It also monitors the high DC voltage at 102 by monitoring the output 112 from the A to D converter 110. When the microcomputer 108 determines that the AC line voltage is falling and is likely to fail entirely, the microcomputer 108 begins to monitor the output of the high voltage supply and control 100 via the A/D converter 110. As this occurs, the pulse width modulator 38 responds to the falling voltage at the output 20 by increasing the pulse width produced thereby so as to maintain the output voltage at 20 at the desired 5 volt level. The microcomputer 108 can determine from the measured high voltage at point 102 exactly what the pulse width modulator 38 must do in order to maintain a 5 volt output at 20. At the same time, the microcomputer 108 calculates, based on the battery voltage measured via the A/D converter 114, the necessary pulse width which would be required in order to produce a 5 volt output if the battery were being used as the source of energy for the output at 20. When the microcomputer 108 determines that the pulse width being generated by the pulse width modulator 38 is the same as would be required if the backup battery 64 were to be switched into the circuit, then the microcomputer 108 changes the mode on the mode signal line thereby causing the steering circuit 36 to direct the pulse width modulated signal from the output 48 to the line 70 which couples to the battery chopper switch 66. The battery chopper switch 66 produces an output signal on the line 68 which is identical to the signal previously being produced on the line 32. Accordingly, as the AC line fails, the microcomputer 108 monitors the operation of the power supply and switches in the backup battery at the precise moment when the pulse width produced by the pulse width modulator will cause the output of the power supply to be identical regardless of whether the backup battery 64 is utilized or whether the high voltage DC at 10 is utilized as the source for the output at 20. It will be readily understood that this precise time is but a fleeting moment as when a failure on the AC line occurs, the high voltage DC at point 10 will fall quite quickly.

Once operating in the battery backup mode, the microcomputer 108 continues to monitor the output of the high voltage DC supply and control at point 102 and when the AC line begins to return to normal, the microcomputer 108 responds by placing phasing signals on the line 106 to adjust the output of the high voltage DC supply and control 100. In this way, the high voltage DC supply and control output at 102 is prevented from going to its maximum output immediately but is gradually increased by slowly changing the phase control signals on the line 106 until the DC output at 102 is the same as would be required by the circuit of FIG. 1 to produce the desired 5 volt output when the power converter 16 is gated by the identical pulses being produced at that time by the pulse width modulator 38. When this condition exists, the microcomputer 108 changes the level on the mode line which causes the steering circuit 36 to divert the pulses from pulse width modulator 38 to the power converter 16 and to stop further transmission of pulses over the line 70 to the battery chopper switch 66. Once the switch over occurs, the microcomputer 108 can continue to adjust the phasing signals on the line 106 so that the high voltage DC supply and control 100 can ultimately be operated at its maximum output voltage. As this occurs, the pulse width modulator 38 responds to the rising output voltage at point 102 to subsequently reduce the pulse width of the pulses produced thereby so as to maintain the output voltage to the desired 5 volt level.

Accordingly, as the AC line returns to normal, the operation of the power supply of the present invention causes the high voltage DC to be gradually raised to a level which will make the rest of the power supply, utilizing the pulses then being produced by the pulse width modulator 38, produce the same output voltage and current as the backup battery 64, the battery chopper 66 and the output filter 34 are then producing. Once this level is reached, the mode signal changes and the high voltage DC begins to power the power converter 16, the isolation and stepdown transformer 24 and the output rectifier 30 so as to place essentially the identical signal on the line 32 from the rectifier 30 to the output filter 34 as previously appeared on the line 68 between the battery chopper switch 66 and the output filter 34. When the operation switch over occurs, the input conditions to the output filter 34 are as close to identical as possible. Accordingly, little if any transient voltages appear at the output of the filter 34 as a result of the switching from battery backup mode to AC line mode.

It is advantageous to switch from battery backup to AC line power in synchronism with the clock on line 44. When this occurs, one pulse is sent from the battery chopper switch 66 to the output filter 34 and the next pulse is sent by the output rectifier 30. This synchronous switching minimizes the output transients. Even if this added synchronizing is not present, the switching transients are largely removed by the output filter 34 and the fact that the output of the output rectifier 30 is the same as the output of the chopper switch 66.

Figure 5A:
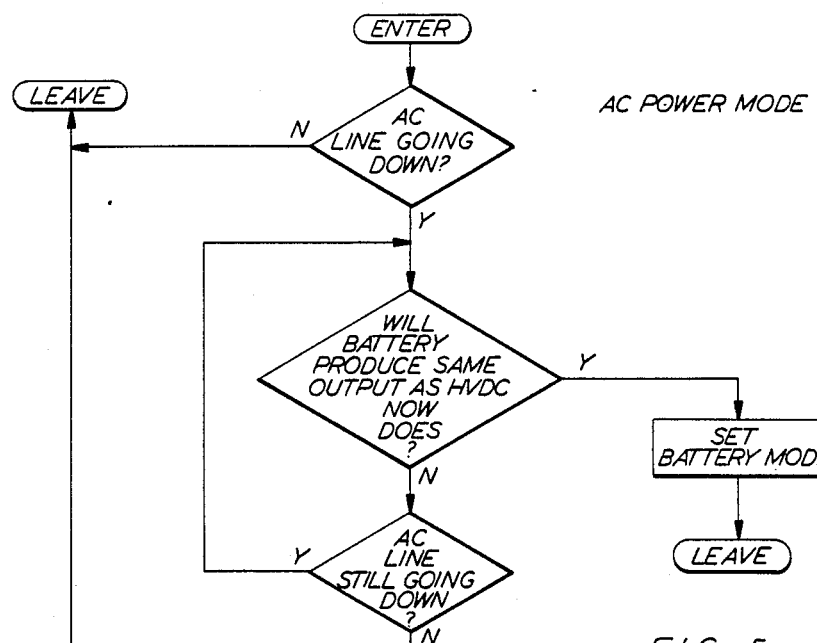
FIGS. 5a and 5b are flow charts of the control for switching between AC power and battery backup.
Figure 5B:
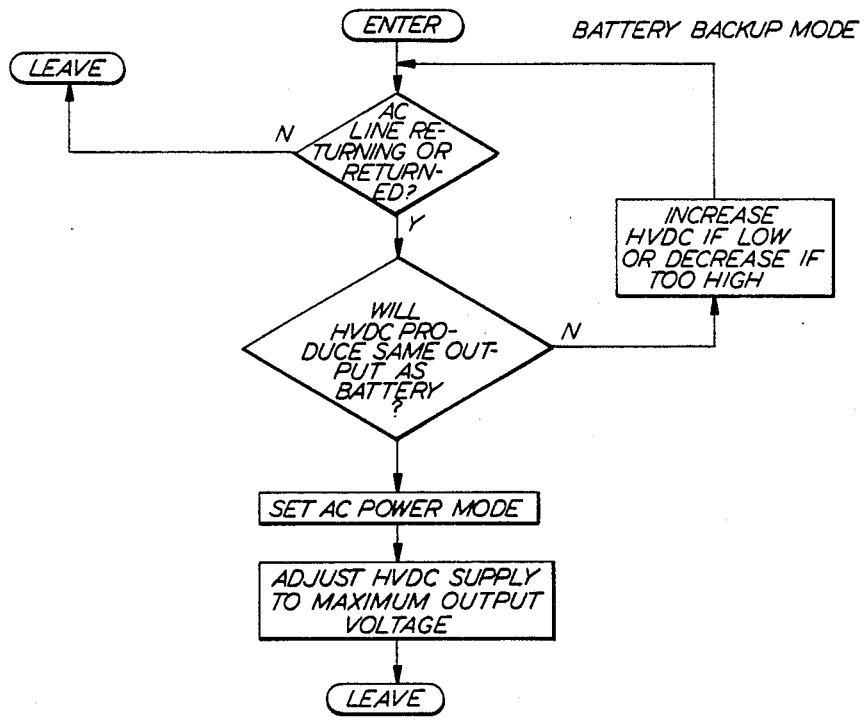

The general operation of the microcomputer during mode switching is illustrated in FIGS. 5a and 5b. The flow chart of FIGS. 5a and 5b can easily be implemented and may comprise the entire activity within the microprocessor 108 or may comprise one of many repeating tasks assigned to the microprocessor 108.

FIG. 3 illustrates how the detailed circuit diagram of FIGS. 4a–4b and FIGS. 4c and 4d fit together. The detailed illustration of FIGS. 4a–4d show the exact implementation of the circuitry illustrated in functional block diagram form in FIG. 1. Those of skill in the art will recognize that this implementation of FIGS. 4a–4d is but one of many possible ways to implement the functions of FIG. 1 and that the drawings are only illustrative of the preferred implementation at the time of filing this patent application.

What is claimed is:

1. A power supply system with a battery backup which is switched into the supply when the AC line fails and switched out of the supply when the AC line is available, the switching occurring with a minimum effect on the supply output, the power supply system comprising, in combination:

a high voltage direct current module responsive to the AC line to produce a high voltage direct current output;

converter means responsive to an externally generated pulse width modulated control signal to convert said high voltage direct current output into a low voltage pulsed output, said low voltage pulsed output having the same duty cycle as said pulse width modulated control signal;

a backup battery;

a reference source for producing a reference voltage;

a battery chopper switch responsive to an externally generated pulse width modulated control signal to produce a pulsed battery output having the same duty cycle as said pulse width modulated control signal;

output filter means responsive to said low voltage pulsed output or said pulsed battery output to produce a filtered direct current output;

a pulse width modulator circuit for producing said pulse width modulated control signal at a given frequency, said pulse width modulator circuit responding to said direct current output and said reference so as to produce a pulse width modulated control signal with a greater duty cycle if said direct current output falls relative to said reference voltage and to produce a pulse width modulated control signal with a smaller duty cycle if said direct current output rises relative to said reference voltage;

a steering circuit responsive to said pulse width modulated signal and an externally generated steering signal to couple said pulse width modulated signal to either said battery chopper switch or said means to convert as a function of said steering signal; and microcomputer means, responsive to the failing of said AC line voltage, to change said steering signal so that said pulse width modulated signal is applied by said steering circuit to said battery chopper switch, said steering signal changing state at the time where said pulse width modulated signal when applied to either said battery chopper or said means to convert will produce the same filtered direct current output.

2. The power supply system of claim 1 wherein said mocrocomputer means is responsive to said AC line returning to normal after a failure has occurred to change said steering signal so that said pulse width modulated signal is applied by said steering circuit to said means to convert at the time where said pulse width modulated signal when applied to either said battery chopper or said means to convert will produce the same filtered direct current output.

3. The power supply system of claim 1 wherein said high voltage direct current module includes means to adjust the voltage of said direct current output in response to signals received from said microcomputer.

4. The power supply system of claim 3 wherein said microcomputer means is responsive to said AC line returning to normal after a failure has occurred to produce signals to said high voltage direct current module to maintain said high voltage direct current output at a level which would produce the same filtered direct current output as is currently being produced by said battery and said battery chopper switch, said microcomputer thereafter changing said steering signal so that said pulse width modulated signal is applied by said steering circuit to said means to convert and removed from said battery chopper switch.

5. The power supply system of claim 4 wherein said microcomputer, after said steering signal has been changed, adjusts said high voltage direct current module to its maximum output voltage.

6. The power supply system of claim 1 wherein the speed of adjustment of said pulse width modulator is slow enough that said filtered direct current output does not oscillate.

7. The power supply system of claim 1 wherein said means to convert includes a power converter responsive to said pulse width modulated signal to produce a low current chopped high voltage DC output and means responsive thereto to produce a chopped and rectified low voltage high current output which is input to said output filter to produce said filtered direct current output when said AC line is normal.

* * * * *